United States Patent
Heidloff et al.

(10) Patent No.: US 7,624,151 B2
(45) Date of Patent: Nov. 24, 2009

(54) SMART SIZE REDUCTION OF A LOCAL ELECTRONIC MAILBOX BY REMOVING UNIMPORTANT MESSAGES BASED ON AN AUTOMATICALLY GENERATED USER INTEREST PROFILE

(75) Inventors: Niklas Heidloff, Salzkotten (DE); Michael R. O'Brien, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1022 days.

(21) Appl. No.: 11/078,753

(22) Filed: Mar. 11, 2005

(65) Prior Publication Data

US 2006/0206569 A1   Sep. 14, 2006

(51) Int. Cl.
*G06F 15/16* (2006.01)
(52) U.S. Cl. ...................................... 709/206
(58) Field of Classification Search ................... 709/206, 709/207
See application file for complete search history.

(56) References Cited

U.S. PATENT DOCUMENTS

| | | | |
|---|---|---|---|
| 6,247,076 B1 | 6/2001 | Ono | |
| 6,334,140 B1 | 12/2001 | Kawamata | |
| 2003/0182383 A1 | 9/2003 | He | |
| 2004/0133645 A1* | 7/2004 | Massanelli et al. | 709/206 |
| 2004/0266397 A1* | 12/2004 | Smith et al. | 455/412.1 |

* cited by examiner

Primary Examiner—Andrew Caldwell
Assistant Examiner—Jason Recek
(74) Attorney, Agent, or Firm—David A. Dagg

(57) ABSTRACT

A system that enables a user to conveniently reduce the size of one or more mailboxes stored on the client computer system. The user can indicate that "unimportant" email messages are to be removed from one or more mailboxes. Unimportant email messages are automatically removed before important ones. To calculate the importance of a message for a given user, message attributes such as users associated with and/or terms contained in the message are compared against a personal interest profile associated with the local user. Additionally, dates associated with the message, such as when the message was added to the mailbox, and/or when the message was last read, may be used to further determine message importance. The size of a message may also be considered when determining whether a message should be removed.

17 Claims, 4 Drawing Sheets

SMART SIZE REDUCTION OF A LOCAL ELECTRONIC MAILBOX BY REMOVING UNIMPORTANT MESSAGES BASED ON AN AUTOMATICALLY GENERATED USER INTEREST PROFILE

FIELD OF THE INVENTION

The present invention relates generally to electronic mail systems, and more specifically to a system and method for smart size reduction of a local electronic mailbox based on a user's interest profile.

BACKGROUND OF THE INVENTION

Electronic mail ("email") systems typically include one or more "mailbox" containers. Common mailboxes in existing systems include an "Inbox" mailbox for storing received messages, an "Outbox" for storing messages that are to be sent, a "Sent Items" mail box for storing messages that have been sent, a "Deleted Items" mailbox for storing messages that have been deleted, and others that may be system defined or defined by the user as "folders" to organize messages as needed. At any given point in time, each mailbox may contain many individual electronic mail messages. Some existing email systems operate by forming local replicas of a user's mailboxes on the client computer system, based on stored copies of the messages on a server system. A problem may occur in these systems because a significant amount of disk space may be used on the client system as the local mailbox replicas increase in size. Accordingly, a local mailbox may have an associated size limit that cannot be exceeded. In order to meet such size limits, and to generally reduce the sizes of local mailboxes, there are different things a user can do through existing systems, each of which have certain disadvantages.

First, a user can simply delete certain email messages from their mailbox manually. Unfortunately, this manual approach of may take a significant amount of user time to perform. Second, in some existing systems, a user can define mailbox replication settings causing the email system to remove documents that have not been modified over some period of time. This approach has the disadvantage that it typically removes documents indiscriminately with regard to their importance. As a result, messages may be removed that are important to the user, such as those that may have only recently been read. Finally, archiving mechanisms on some systems allow a user to make explicit definitions of selection statements identifying documents to be archived by transfer to a server system remote from the client. These systems enable a user to indicate a maximum message age above which messages should be archived. For example, some systems allow a user to manually enter an archive setting specifically indicating that only documents from person 'x' that are older than ninety days are to be remotely archived. However, such manual systems require the local user to continually modify such archive settings to reflect the user's current message archiving needs. In addition, users may not have sufficient time to create and maintain such manual archive settings as their work assignments or roles change, resulting in new message archiving needs. Moreover, it is important to carefully determine which messages are to be archived, since after a document is moved to a remote archive, it becomes more difficult to access. Full text searches, sorting, and other features may not work on archived documents. Archives themselves may be difficult for the user to locate. These archiving systems do not automatically determine information regarding which other users and which terms are important for a given user of the client system, and accordingly cannot make use of such information in selecting messages to be archived.

SUMMARY OF THE INVENTION

To address the above described and other shortcomings of the prior art, a method and system are disclosed that enable a user to conveniently reduce the size of one or more mailboxes locally stored on a client computer system. In the disclosed system, a user can indicate generally that unimportant email messages are to be removed from one or more mailboxes prior to important ones. For example, this may be accomplished through a replication setting available to the user indicating that the email system should reduce the size of one or more local mailbox replicas by removing unimportant messages. When the user selects or enters this setting, the underlying email system operates to automatically determine which messages are important to the local user, and may delete some number of messages that are relatively unimportant. Alternatively, the user may enter or select a setting that causes the email system to archive some number of relatively unimportant messages to a remote server system.

The disclosed system operates to automatically delete or archive unimportant email messages while keeping important messages locally available for convenient access. To automatically calculate the importance of a given email message, various message attributes may be used. These attributes include the identity of users and/or terms associated with a message, such as senders and/or receivers of a message, and/or terms contained within the message. Such message attributes are automatically compared with the contents of a personal interest profile automatically maintained for the local user. The personal interest profile contains identifiers of persons that are automatically determined as important to the local user, and/or keywords that are also automatically determined to be important to the local user. Other message attributes may additionally be used to determine message importance for mailbox size reduction purposes, such as the time at which a message was added to a mailbox, when a message was last read, and/or the size of a message. In one embodiment, the disclosed system employs replication adapter software on the client computer system to remove unimportant email messages. Alternatively another type of software task or thread may used in this regard.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
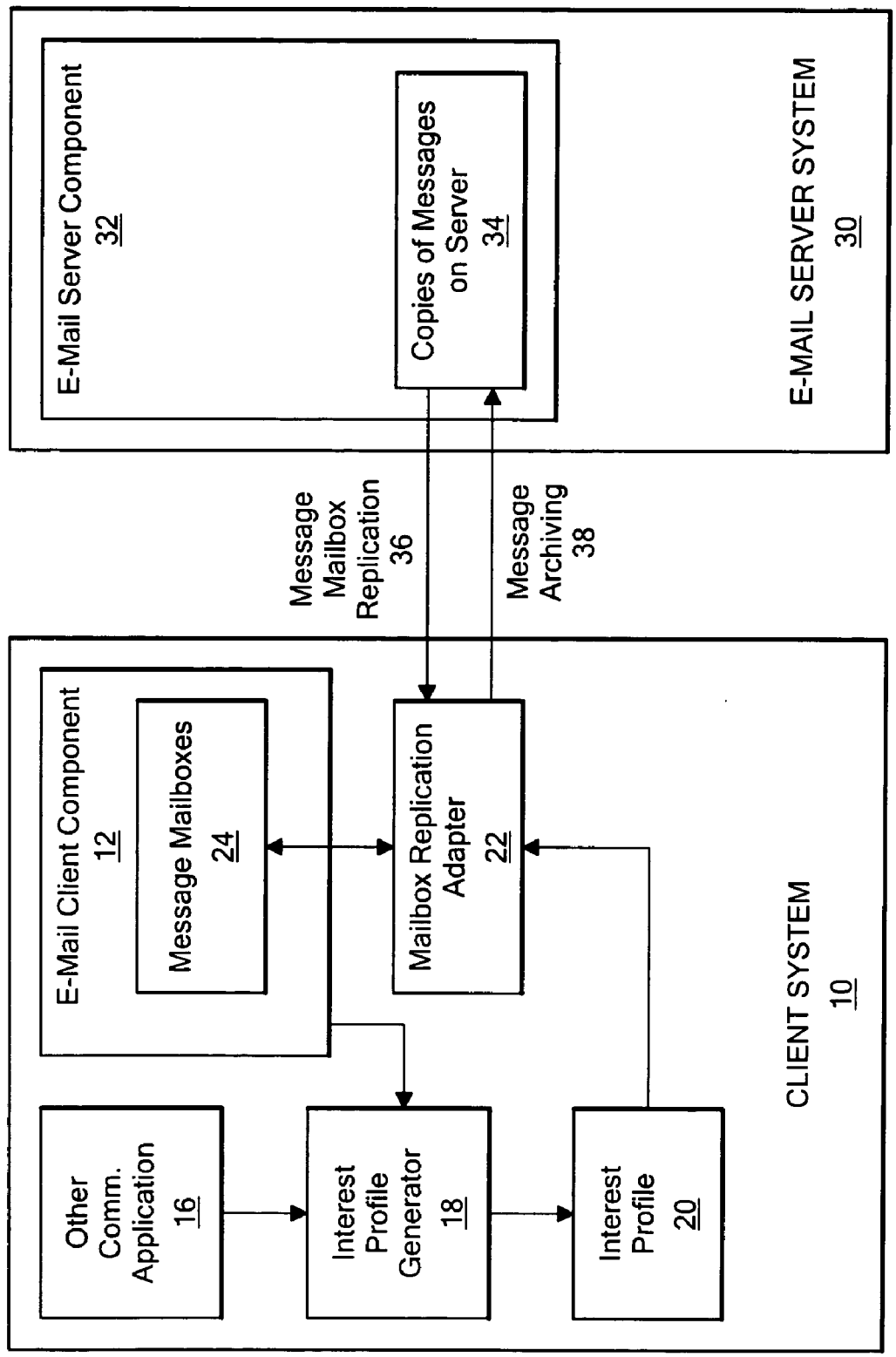
FIG. 1 shows software components in an illustrative embodiment.

As shown in FIG. 1, an illustrative embodiment of the disclosed system operates using a number of software components executing on at least one client computer system, shown for purposes of illustration as the client system 10, and at least one server computer system, shown for purposes of illustration as electronic mail ("email") server system 30. The client system 10 and email server system 30 may, for example, each include at least one processor, program storage, such as memory, for storing program code executable on the processor, and one or more input/output devices and/or interfaces, such as data communication and/or peripheral devices and/or interfaces. The client system 10 and email server system 30 are communicably connected by a data communication system, such as a Local Area Network (LAN), the Internet, or the like. The client system 10 and email server system 30 may further include appropriate operating system software.

The client system 10 is shown including an email client software component 12, and other communication application software 16. The other communication application 16 may, for example, be an instant messaging, internet telephony, or any other specific type of communication application. An interest profile generator software component 18 monitors operation of the email client component 12 and other communication application 16 to automatically generate the interest profile 20. The interest profile 20 contains identifiers of other users that are automatically determined to be important to a local user of the client system 10. The determination of which other users are important to the local user may, for example, be based on which other users the local user has been in communication with through the email client component 12 and/or the other communication application 16. Another user may be determined to be important to the local user if the local user has been in relatively frequent communication with that other user, and/or if the local user has been in relatively recent communication with that other user. For example, another user may be determined to be important to the local user if the local user has communicated with that user within some predetermined period of time, or if the local user has communicated with that other user more recently than with other users that are determined to be relatively unimportant. Identifiers of important other users may be read from and/or based on the contents of an address book and/or buddy list found in the email client component 12 and/or other communication application 16.

The interest profile 20 further may include some number of keywords that are considered important to the local user of the client system 10. The keywords in the interest profile 20 may consist of words or phrases determined based on the contents of communications between the local user and other users through the email client component 12 and other communication application 16. For example, keywords in the interest profile 20 may be words or phrases that occur relatively frequently in such communications, or which occur in subject lines of such communications, or any other words or phrases that are important to the local user.

A software component on the client system 10, shown for purposes of illustration as the mailbox replication adapter component 22, operates to reduce the size of one or more message mailboxes 24 associated with the email client component 12. The message mailboxes 24 are software structures containing email messages, such as those generally referred to in email applications as an "Inbox", "Outbox", "Sent Items", other system defined mailboxes, user defined message folders, and/or any other specific type of electronic mail message mailbox. The mailbox size reduction performed by the mailbox replication adapter 22 is based on the contents of the interest profile 20.

In order to reduce the size of one or more of the message mailboxes 24, the mailbox replication adapter 22 operates to determine an importance level of each message in a mailbox. The importance level of a message reflects message attributes, such as users associated with the message, including an identifier of a user that sent the message to the local user, or an identifier of a user that received the message from the local user. If such users associated with a message match a user identifier for an important user in the interest profile 20, then the associated message may be determined to be relatively more important than another message that is associated with no such matching users. Similarly, if a message includes one or more terms or phrases matching one or more of the keywords contained in the interest profile 20, then that message may be determined to be relatively more important than another message containing no such, or fewer such, matching terms or phrases. Thus a message may be considered more important the more matches it has with user identifiers and/or keywords in the interest profile 20. In an embodiment in which user identifiers and/or keywords are ranked in relative importance within the interest profile 20, for example based on frequency and/or recentness of such user identifiers and/or keywords within messages communicated through the email client component 12 or other communication application component 16, such rankings may further be factored into the importance level determined for each message.

The mailbox size reduction performed by the mailbox replication adapter 22 may result in the size of a mailbox being reduced by some predetermined amount, in terms of bytes, number of messages, or some other size metric. The mailbox size reduction may be performed such that the resulting mailbox size is less than a size limit or quota associated with the mailbox being reduced. The mailbox size reduction performed by the mailbox replication adapter 22 may be performed in response to a user setting that may be provided through a graphical user interface generated by the email client component 12, and indicating that messages automatically determined to be unimportant are to be removed from one or more of the message mailboxes 24 prior to those determined to be important.

The mailbox reduction performed by the mailbox replication adapter 22 may include deleting some number of unimportant messages, or in archiving such unimportant messages onto the email server system 30. Such archiving is shown by the message archiving operation 38 of FIG. 1. When a message is archived, it may be removed from a mailbox on in the client system 10, and moved to the copies of messages 34 stored on the email server system 30. The reduction of mailbox size performed by the mailbox replication adapter 22 may also or alternatively operate to control message mailbox replication 36, in which copies of messages 34 on the email server system 30 are moved to the message mailboxes 24 on the client system 10. In such an embodiment, the mailbox replication adapter 22 reduces the size of a mailbox that is being replicated from the email server system 30 to the client system 10 by removing some number of unimportant messages from the mailbox. As shown in FIG. 1, the copies of messages 34 may be stored in conjunction with an email server software component 32.

While the software component operating to perform mailbox reduction is shown in FIG. 1 as the mailbox replication adapter component 22, the present invention is not limited to such an embodiment. Accordingly, those skilled in the art will recognize that any other specific type of component may be used in this regard, including but not limited to another software task or thread separate from the email client component 12. Similarly, while the interest profile 20 is described above as being determined by the interest profile generator 18 in response to the email client component 12 and the other communication application 16, the present invention is also not limited to such an embodiment. Accordingly, an interest profile including identifiers of important other users and/or keywords that are important to a local user may be automatically generated in any appropriate manner for a given embodiment of the disclosed system.

Figure 2:
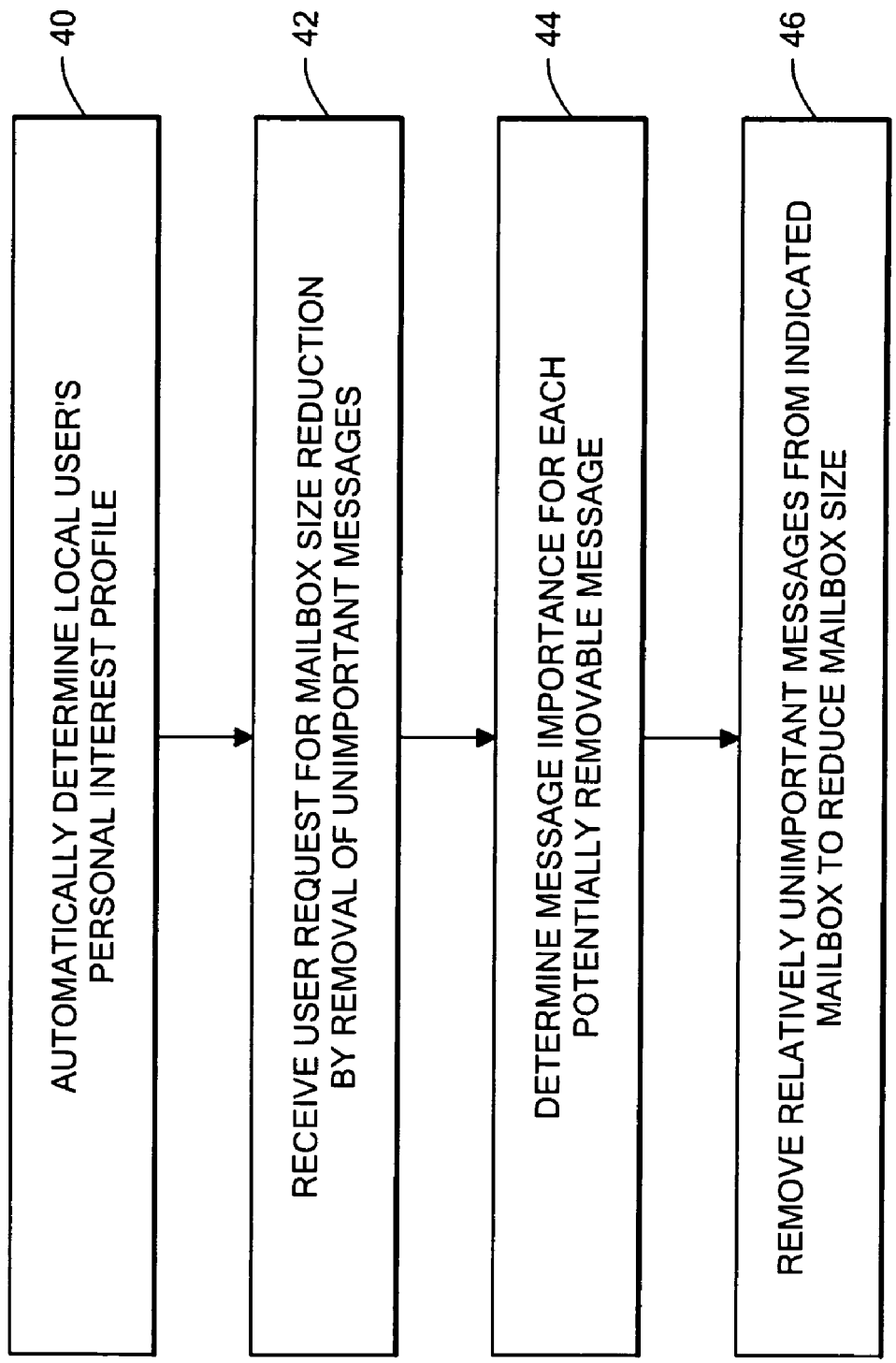
FIG. 2 shows steps performed in the illustrative embodiment.

FIG. 2 is a flow chart illustrating steps performed by an embodiment of the disclosed system. At step 40, the local user's personal interest profile is determined. The interest profile determined at step 40 includes important person identifiers, and/or some number of keywords that are important to the local user. At step 42, the disclosed system receives a request for mailbox size reduction by removal of unimportant messages. Such a request may, for example, consist of an archive setting provided through a user interface generated by an email application client, selection of a button display object, or any other appropriate indication from the user.

At step 44, the disclosed system operates to determine message importance for each potentially removable message. Removable messages may, for example, consist of those messages stored in a mailbox for which request for reduction based on message importance was received at step 42, and/or for which a current size is currently approaching, at, or exceeding, a mailbox size limit.

The determination of message importance may, for example, be performed at step 44 based on the following criteria:

a) The older a message is the less important it is.

b) The more recently that a message has been read/opened the more important it is.

c) The more users associated with a message, such as authors, editors, recipients, or senders, that match identifiers of important users in the local user's interest profile, the more important a document is. In one embodiment, in which the important users are ranked by importance within the interest profile, the higher the users associated with the message are ranked in the interest profile the more important the message.

d) The more terms or phrases in the message that match keywords in the interest profile, the more important a document is. In one embodiment, in which keywords are ranked by importance within the interest profile, the higher the term or phrases found in the message are ranked in the interest profile the more important the message.

The above criteria may be themselves be ranked in importance. For example, the time since a message has been read or opened may be the most important criteria in determining message importance, followed by the number of matches with important person identifiers in the interest profile. Next in importance could be the number of matches between terms or phrases in the message with keywords in the interest profile. The age of the message may be considered a less important criteria than the others. In one embodiment, messages are considered potentially removable only in the case where they exceed a predetermined message size. For example, messages may be considered removable only in the event that they exceed five kilobytes (5 KB) in size.

At step 46, the disclosed system removes relatively unimportant messages from one more mailboxes on the client system in order to meet size reduction goals as defined by the request received at step 42, or as predetermined by mailbox size limits. The messages removed may be deleted, or archived by being moved to a remote server system.

It should be noted that the disclosed mailbox size reduction techniques may be embodied such that they are responsive to replication user settings providing indication that unimportant messages are not to be replicated onto the client. However, it should further be noted that the disclosed mailbox size reduction may be alternatively or additionally embodied as responsive to archive user settings indicating that unimportant messages are to be archived prior to important messages.

Figure 3:
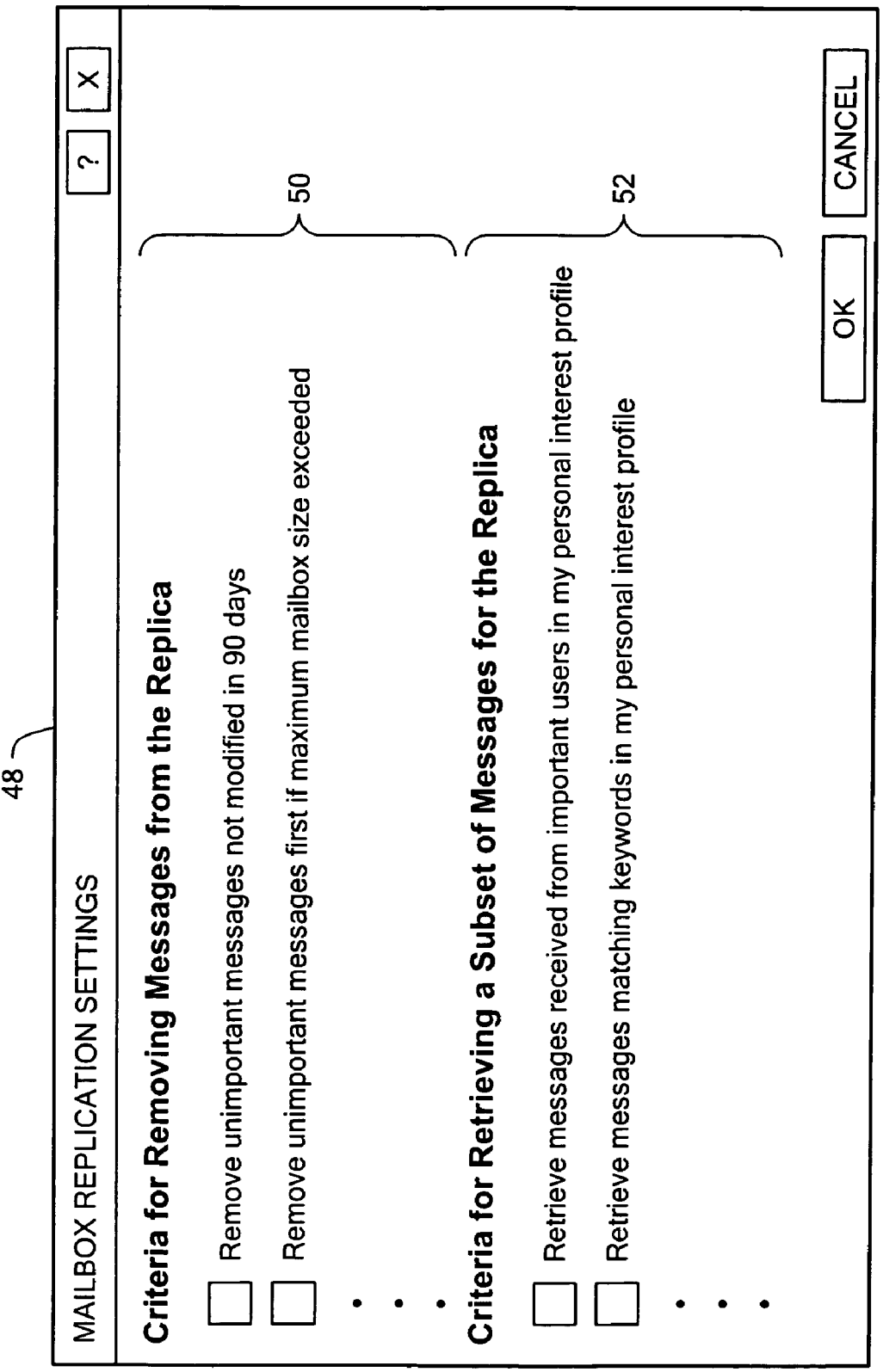
FIG. 3 is an example of a mailbox replication user settings dialog box in an illustrative embodiment.

For example, FIG. 3 shows a graphical user interface display window 48 allowing a user to provide message mailbox replication settings. In the example of FIG. 3, the user can indicate, by checking associated boxes, a number of criteria 50 for removing messages from the mailbox replica. The criteria 50 may include settings that allow removal of messages from the replicated mailbox based on their relative unimportance, determined in response to the user's personal interest profile. For example, the criteria 50 allow the user to select a user setting that removes unimportant messages not modified in 90 days. Another user setting results in removal of unimportant messages in the event that the mailbox exceeds a predetermined maximum size. Various other removal criteria may be included in the criteria 50, also based on importance determinations for the messages in the corresponding mailbox.

The message retrieval criteria 52 enable the user to indicate user settings that control which messages are included in a subset of possible messages for replicating to the client computer system. The criteria 52 may include settings that allow filtering of replicated messages based on their relative unimportance, determined in response to the user's personal interest profile. For example, the criteria 52 allow a user to select a user setting that retrieves messages received from important users, as indicated by the user's personal interest profile. Another user setting results in retrieval of messages matching keywords in the user's personal interest profile. Various other retrieval criteria may be included in the criteria 52, also based on importance determinations for messages in the corresponding mailbox.

Figure 4:
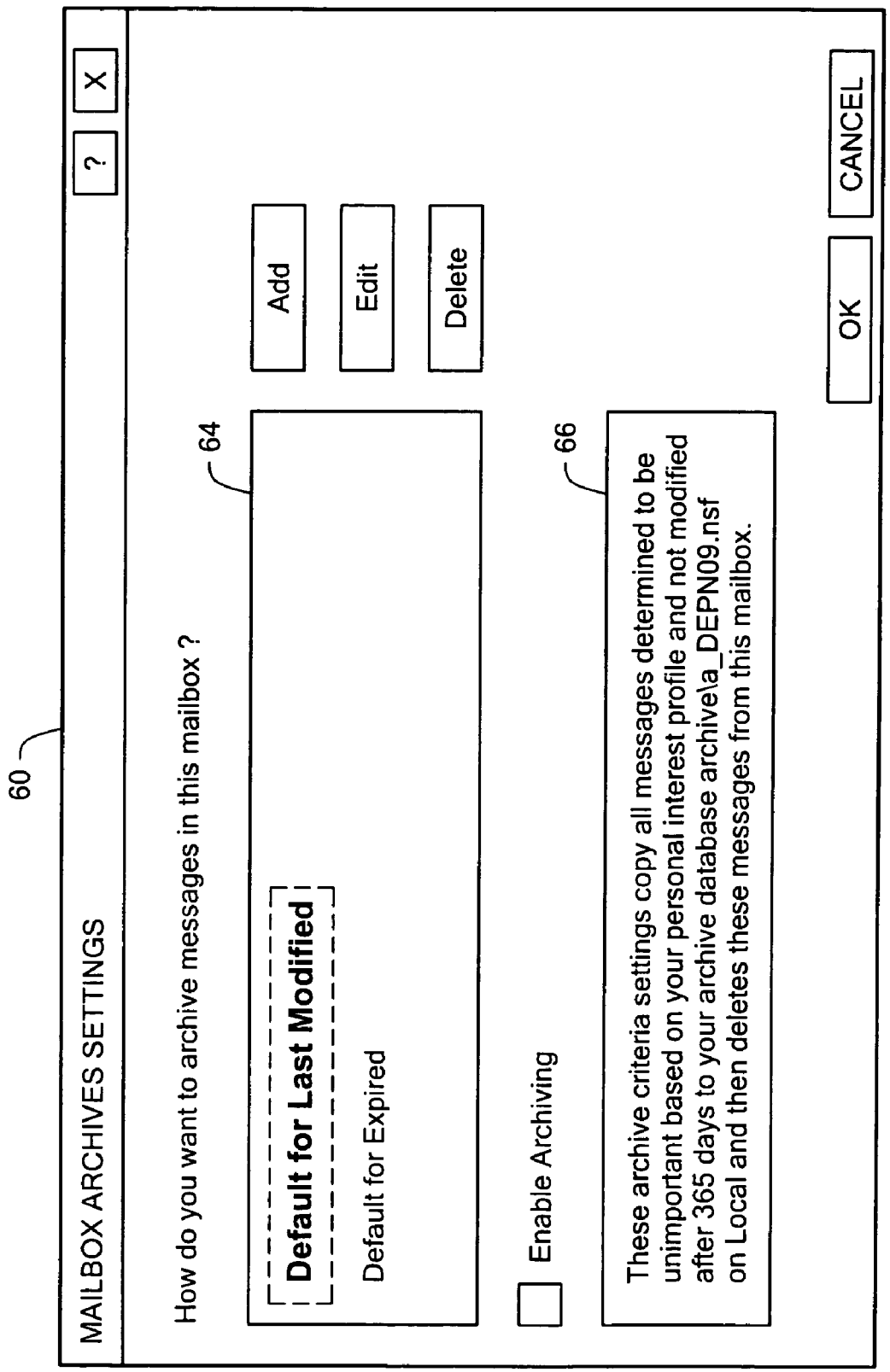
FIG. 4 is an example of a mailbox archiving user settings dialog box in an illustrative embodiment.

FIG. 4 shows a graphical user interface display window 60 allowing a user to provide mailbox archive settings. In the example of FIG. 4, the user can indicate, by adding, editing and deleting operations, a number of user settings 64 for archiving messages from a mailbox. The user settings 64 may allow for archiving of messages from the mailbox based on their relative unimportance, determined in response to the user's personal interest profile. For example, the currently selected "Default for Last Modified" user setting is described in the box 66 as operating to copy messages from the mailbox if they are not modified in 365 days, and then deleting the messages from the mailbox. Other archive settings based on message importance determined in response to the user's personal interest profile are also possible.

In another aspect, an alternative embodiment of the disclosed system may operate to provide a graphical user interface dialog box upon detection of the fact that a mailbox size has exceeded its maximum permitted size. Such an interface window would announce to the user that some number of unimportant messages, determined based on the contents of the user's personal interest profile, and that are older than some time period (e.g. 90 days), will be deleted.

Additionally, the disclosed system may be embodied to provide user access to the personal interest profile itself, so that the user can read and/or edit its contents. Beyond identifiers of important persons and keywords, other importance attributes may be added to the personal interest profile. Such importance attributes may, for example, include indications that:

i) messages that were never read are to be considered less important than those that have been read, ii) messages that were never responded to are to be considered less important than those that have been responded to, iii) messages opened some "n" number of times or more should never be deleted, iv) messages that were opened and quickly closed should be considered less important than messages that were kept open for some minimum time period.

Those skilled in the art will recognize that the disclosed system provides many advantages over previous systems. In addition to overall space savings through mailbox size reduction, performance of the email client is also improved. Specifically, queries, index updates, and other operations can be performed faster on reduced size mailboxes, since there is less data to be covered.

FIGS. 1-2 are block diagram and flowchart illustrations of methods, apparatus(s) and computer program products according to an embodiment of the invention. It will be understood that each block of FIGS. 1-2, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

We claim:

1. A method for reducing the size of a local electronic mail mailbox, comprising:
   automatically determining a user interest profile for a local user of a client computer system;
   determining, by a replication component in said client computer system, an importance level for each of a plurality of electronic mail messages stored in at least one mailbox structure on said client computer system, wherein said determining said importance level includes determining a last time said local user of said client computer system opened each of said plurality of electronic mail messages, wherein said importance level determined for each one of said electronic mail messages is based, at least in part, on the contents of said user interest profile and said last time said local user of said client computer system opened each one of said electronic mail messages, and wherein said determining said importance level of each of said electronic mail messages includes calculating higher importance levels for those ones of said electronic mail messages last opened more recently by said local user of said client computer than other ones of said electronic mail messages;
   determining, by said replication component in said client computer system responsive to said importance levels determined for each of said plurality of electronic mail messages, an unimportant subset of said plurality of electronic mail messages, wherein each electronic mail message in said unimportant subset of said plurality of electronic mail messages has an associated importance level less than any importance level associated with those of said plurality of electronic mail messages not in said unimportant subset; and
   reducing a size of said mailbox structure by said replication component in said client computer system removing said unimportant subset of said plurality of electronic mail messages from said mailbox structure on said client computer system, and wherein said reducing further includes archiving said unimportant subset of said plurality of electronic mail messages to storage on a remote server system, such that said size of said mailbox structure is reduced to a size limit associated with said mailbox structure.

2. The method of claim 1, wherein said automatically determining said user interest profile comprises automatically determining at least one important other user and storing an identifier of said important other user in said user interest profile, and wherein said determining said importance level of each of said electronic mail messages includes calculating a higher importance level for a given message in the event that a user identifier associated with said given message matches said identifier of said important other user stored in said user interest profile.

3. The method of claim 2, wherein said user identifier associated with said given message identifies a sender of said given message.

4. The method of claim 2, wherein said identifier of said user associated with said given message identifies a receiver of said given message.

5. The method of claim 2, wherein said automatically determining said at least one important other user comprises monitoring at least one communication application on said client computer system to automatically determine the identity of at least one other user with whom said local user has recently communicated.

6. The method of claim 1, wherein said automatically determining said user interest profile comprises determining at least one keyword important to said local user, and storing said keyword in said user interest profile, and wherein said determining said importance level of each of said electronic mail messages includes calculating a higher importance level for a given message in the event that said given message includes said keyword.

7. The method of claim 6, wherein said importance level of said given message is higher in the event that said keyword is present in a subject line of said given message than in the even that said keyword is present in a body of said given message.

8. The method of claim 1, further comprising obtaining a replication setting from said local user indicating that said size of said mailbox structure on said client computer system is to be reduced by said removing of said unimportant subset of said plurality of electronic mail messages contained in said mailbox structure.

9. A system including at least one processor and a computer readable memory in a client computer system, said computer readable memory having program code stored thereon for reducing the size of a local electronic mail mailbox, said program code comprising:

program code for automatically determining a user interest profile for a local user of a client computer system;

program code for determining, by a replication component in said client computer system, an importance level for each of a plurality of electronic mail messages stored in at least one mailbox structure on said client computer system, wherein said determining said importance level includes determining a last time said local user of said client computer system opened each of said plurality of electronic mail messages, wherein said importance level determined for each one of said electronic mail messages is based, at least in part, on the contents of said user interest profile and said last time said local user of said client computer system opened each one of said electronic mail messages, and wherein said determining said importance level of each of said electronic mail messages includes calculating higher importance levels for those ones of said electronic mail messages last opened more recently by said local user of said client computer than other ones of said electronic mail messages;

program code for determining, by said replication component in said client computer system responsive to said importance levels determined for each of said plurality of electronic mail messages, an unimportant subset of said plurality of electronic mail messages, wherein each electronic mail message in said unimportant subset of said plurality of electronic mail messages has an associated importance level less than any importance level associated with those of said plurality of electronic mail messages not in said unimportant subset; and program code for reducing a size of said mailbox structure by said replication component in said client computer system removing said unimportant subset of said plurality of electronic mail messages from said mailbox structure on said client computer system, and wherein said reducing further includes archiving said unimportant subset of said plurality of electronic mail messages to storage on a remote server system, such that said size of said mailbox structure is reduced to a size limit associated with said mailbox structure.

10. The system of claim 9, wherein said program code for automatically determining said user interest profile comprises program code for automatically determining at least one important other user and storing an identifier of said important other user in said user interest profile, and wherein said program code for determining said importance level of each of said electronic mail messages includes program code for calculating a higher importance level for a given message in the event that a user identifier associated with said given message matches said identifier of said important other user stored in said user interest profile.

11. The system of claim 10, wherein said user identifier associated with said given message identifies a sender of said given message.

12. The system of claim 10, wherein said identifier of said user associated with said given message identifies a receiver of said given message.

13. The system of claim 10, wherein said program code for automatically determining said at least one important other user comprises program code for monitoring at least one communication application on said client computer system to automatically determine the identity of at least one other user with whom said local user has recently communicated.

14. The system of claim 9, wherein said program code for automatically determining said user interest profile comprises program code for determining at least one keyword important to said local user, and storing said keyword in said user interest profile, and wherein said program code for determining said importance level of each of said electronic mail messages includes program code for calculating a higher importance level for a given message in the event that said given message includes said keyword.

15. The system of claim 14, wherein said importance level of said given message is higher in the event that said keyword is present in a subject line of said given message than in the even that said keyword is present in a body of said given message.

16. The system of claim 9, said program code further comprising program code for obtaining a replication setting from said local user indicating that said size of said mailbox structure on said client computer system is to be reduced by said removing of said unimportant subset of said plurality of electronic mail messages contained in said mailbox structure.

17. A computer program product including a computer readable memory, said computer readable memory having program code stored thereon for reducing, by a client computer system, the size of a local electronic mail mailbox, said program code comprising:

program code for automatically determining a user interest profile for a local user of a client computer system;

program code for determining, by a replication component in said client computer system, an importance level for each of a plurality of electronic mail messages stored in at least one mailbox structure on said client computer system, wherein said determining said importance level includes determining a last time said local user of said client computer system opened each of said plurality of electronic mail messages, wherein said importance level determined for each one of said electronic mail messages is based, at least in part, on the contents of said user interest profile and said last time said local user of said client computer system opened each one of said electronic mail messages, and wherein said determining said importance level of each of said electronic mail messages includes calculating higher importance levels for those ones of said electronic mail messages last opened more recently by said local user of said client computer than other ones of said electronic mail messages;

program code for determining, by said replication component in said client computer system responsive to said importance levels determined for each of said plurality of electronic mail messages, an unimportant subset of said plurality of electronic mail messages, wherein each electronic mail message in said unimportant subset of said plurality of electronic mail messages has an associated importance level less than any importance level associated with those of said plurality of electronic mail messages not in said unimportant subset; and program code for reducing a size of said mailbox structure by said replication component in said client computer system removing said unimportant subset of said plurality of electronic mail messages from said mailbox structure on said client computer system, and wherein said reducing further includes archiving said unimportant subset of said plurality of electronic mail messages to storage on a remote server system, such that said size of said mailbox structure is reduced to a size limit associated with said mailbox structure.

* * * * *